Nov. 26, 1957 J. G. BOOTH ET AL 2,814,312
DIFFERENTIAL PRESSURE OPERATED MEASURING INSTRUMENT
Filed Oct. 19, 1951 2 Sheets-Sheet 1
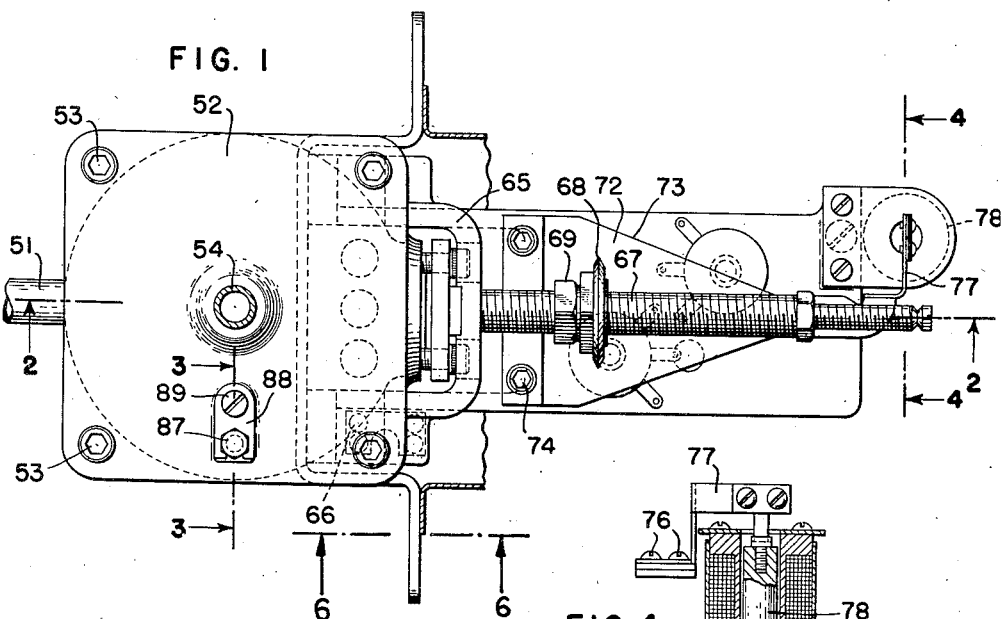
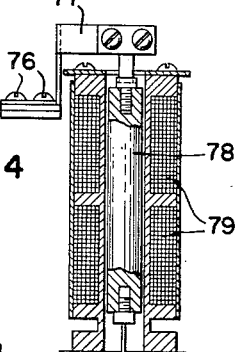
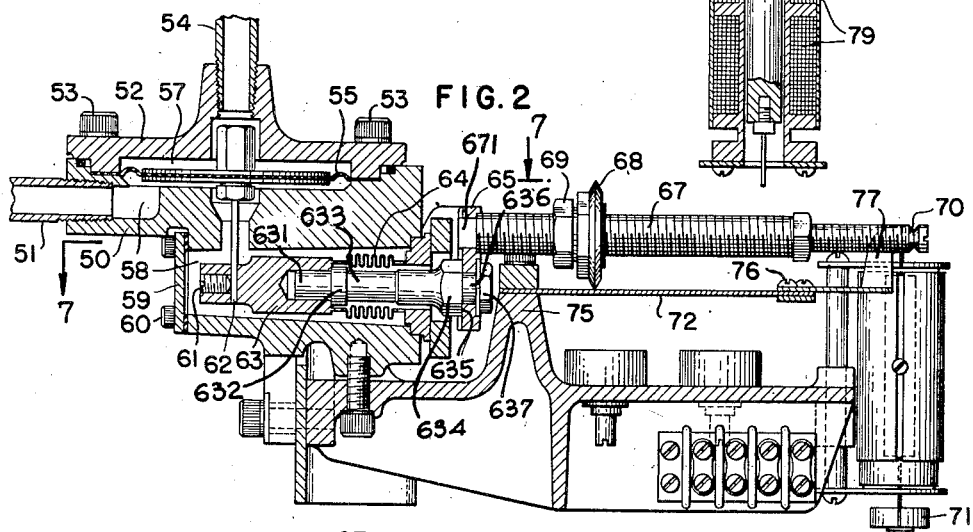
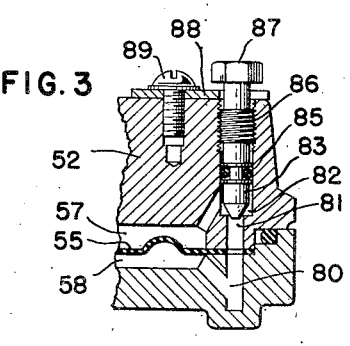
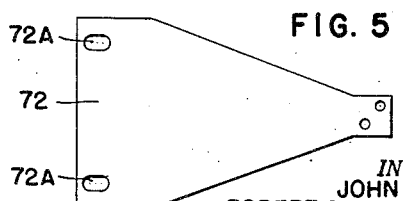
INVENTORS.
JOHN G. BOOTH
ROBERT C. WHITEHEAD JR.
BY WILLIAM F. NEWBOLD
Arthur H. Swanson
ATTORNEY.

INVENTOR.
JOHN G. BOOTH
ROBERT C. WHITEHEAD JR.
BY WILLIAM F. NEWBOLD

ATTORNEY.

United States Patent Office 2,814,312
Patented Nov. 26, 1957

2,814,312
DIFFERENTIAL PRESSURE OPERATED MEASURING INSTRUMENT

John G. Booth, William F. Newbold, and Robert C. Whitehead, Jr., Philadelphia, Pa., assignors to Minneapolis-Honeywell Regulator Company, Minneapolis, Minn., a corporation of Delaware Application October 19, 1951, Serial No. 252,114

9 Claims. (Cl. 137—790)

This invention relates to a differential-pressure-operated measuring instrument having electrical transmission. It is an object of this invention to provide such a measuring instrument having a sensitive element movable in response to any difference between the two pressures applied to the opposite sides thereof. This sensitive element moves a primary beam. The movement of this primary beam in response to the difference between the pressures being measured is resisted by a spring.

It is an additional object of this invention to make this spring in the shape of a cantilever formed of a flat piece of flexible metal of triangular outline supported at its largest transverse dimension and arranged so that the point of contact between the spring and the primary beam may be varied so as to adjust the force with which the spring resists turning movement of the primary beam.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Fig. 1 is a top or plan view.

Fig. 2 is a longitudinal, vertical, cross section on line 2—2 of Fig. 1, viewed in the direction of the arrows.

Fig. 3 is a transverse, vertical, cross section on an enlarged scale on line 3—3 of Fig. 1 viewed in the direction of the arrows.

Fig. 4 is a transverse, vertical, cross section on line 4—4 of Fig. 1 viewed in the direction of the arrows, and Fig. 5 is a top or plan view on a reduced scale showing the cantilever spring.

Figure 6:
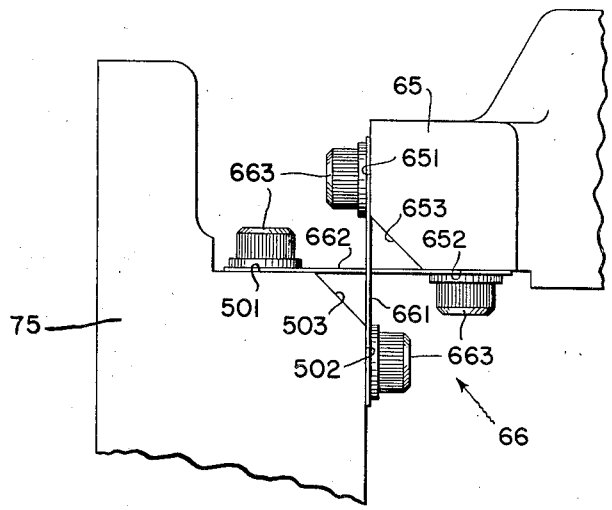
Fig. 6 is a side elevation as viewed from line 6—6 in the direction of the arrows showing the cross spring pivots. The scale of Fig. 6 is approximately three times the scale of Fig. 1.

In this device, a meter body comprises a bottom plate 50 having a conduit 51 leading to the high pressure side of an orifice through which orifice a flow is to be measured or to the higher of two pressures whose differential is to be measured. A top plate 52 is attached to the bottom plate by screws 53 and contains an inlet connection 54 for the lower of the two pressures whose differential is to be measured. A single layer metallic diaphragm 55 separates the upper or lower pressure chamber 57 from the lower or high pressure chamber 58.

A plate 59 is detachably secured to the meter body, and more specifically to the bottom plate 50, by screws 60. Removal of plate 59 affords access to a locking screw 61 by means of which the connecting rod 62 is secured to the bellows rod assembly 63 which forms part of the primary beam and to the diaphragm 55. Sealing bellows 64 permit the primary beam to project out of the high pressure chamber 58. A yoke 65 forms part of the primary beam and is pivotally mounted in the meter body by means of bearings 66 at its ends. Bearings 66 may be in the form of flat, metal strips mounted at right angles to each other.

Fig. 1 shows the cross spring pivots 66 about one third of the distance from the left hand side of the figure.

Figure 7:
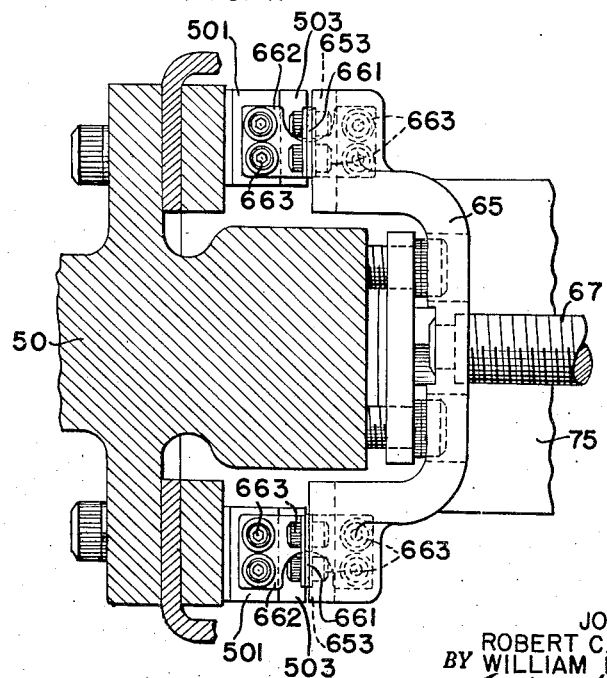
Fig. 7 is a top or plan view taken substantially on the line 7—7 of Fig. 2 as viewed in the direction of the arrows and showing the cross spring pivots. The scale of Fig. 7 is approximately twice the scale of Fig. 2.

Figs. 6 and 7 show the bearings 66 in greater detail. Since these bearings are duplicates a description of one will suffice. These bearings are a well known form of pivot or cross spring bearings. The meter body 75 has a flat, horizontal face 501; a flat, vertical face 502; and a flat, diagonal face 503 connecting the two. Yoke 65 has a flat, vertical face 651; a flat, horizontal face 652; and a flat, diagonal face 653 connecting the two. A vertical, flat metal strip 661 engages with faces 502 and 651. A second, horizontal, flat metal strip 662 engages face 501 and face 652. The strips 661 and 662 are substantially at right angles to each other and are secured to the bottom plate 50 and to the yoke 65 by nuts 663. This construction provides a pivot about the line through the intersection of the strips 661 and 662.

The primary beam which is pivoted for oscillation about bearings 66 comprises the following parts: locking screw 61, bellows rods assembly 63, and a bolt having a cylindrical end 631 having a tight fit with the right end of bellows rod assembly 63. This bolt has, adjacent its left end 631, an enlarged, cylindrical portion 632 and, to the right thereof, a reduced, cylindrical portion 633 terminating in a hexagonal or other multi-sided nut 634. Nut 634 has at its right a vertical face 635 which engages with a vertical face of yoke 65. To the right of face 635 the bolt has a cylindrical portion 636 which passes through a hole in yoke 65 and is secured therein by a nut 637. Screw 67 has at its left end a cylindrical portion 671 which is fastened in a hole in yoke 65 with a forced or tight fit. Thus, the main portions of the primary beam are the bellows rod assembly 63, the yoke 65, and the screw 67. This primary beam and the parts supported thereby are pivotally mounted on the bottom plate 50 of the meter body by means of the cross spring pivots or bearings 66. Thus, the primary beam is free to oscillate about the pivot formed by the bearings 66. A connecting rod 62 secures diaphragm 55 to the left end of the primary beam. In the middle of yoke 65 is mounted a screw 67 on which is screw threadedly carried a rider 68 having a beveled edge and adapted to be secured in position along screw 67 by a span lock in the form of a nut 69. At its outer end, screw 67 has a groove 70 for supporting a calibrating weight, such as weight 71. Alternatively, the calibrating weight 71 may be attached to the free end of the cantilever spring 72 (to be described presently). This is the position of the calibrating weight which is shown in the drawings. This is the preferable construction because calibration is applied to the meter at the point at which the measurement is taken out of the meter i. e., at the armature 78 and the coils 79 (which will be later referred to).

A stationary part of the meter body carries the left end of a cantilever spring 72. Spring 72 is of generally triangular shape, as is seen in Fig. 5. Because of the slope of its sides 73, cantilever spring 72 can be adjusted to balance various loads for a given deflection of spring 72. The holes 72A through which screws 74 (attaching spring 72 to the meter body 75) pass may be elongated in a direction parallel to the length of the primary beam or from left to right as seen in Figs. 1 and 5 of the drawings. This permits spring 72 to be adjustably mounted so as to compensate for the manufacturing tolerances necessary. The effect of varying the width of the spring permits it to provide a varying bias to afford a wide range change within a short space. For example, the wider or left portion of spring 2, when in engagement with the rider 68, may counterbalance a differential pressure on diaphragm 55 equivalent to 300 inches of water.

If rider 68 is adjusted to its extreme right position in Figs. 1 and 2, so that it engages a portion of spring 72 of narrow width, the bias of spring 72 on diaphragm 55 may counterbalance a differential pressure of only 60 inches of water.

At its free or right end, spring 72 is secured by means of screws 76 to a Z-shaped member 77 which supports, at its outer end, an armature 78 which cooperates with a pair of inductance coils 79 forming the transmitting member of a well-known type of electrical transmission. The electrical output of transmitting coils 79 has a decreasing characteristic upon an increase in temperature due to the increase in the resistance of the copper wiring. When plotted as a graph, the slope of this characteristic can be changed by altering the "Q" of the inductance coils 69. On the other hand, the modulus of elasticity of the cantilever spring 72 decreases with an increase in temperature. Therefore, that "Q" of the inductance coils 79 can be chosen so that a given force on the spring 72 will result in a corresponding gain in the electrical output of the inductance coils 79 irrespective of the ambient temperature.

If desired, a slide contact may be substituted for 78 and a cooperating resistance substituted for inductance coils 79.

Figs. 1 and 3 show an integral bypass useful for flushing or purging or bypassing the high pressure chamber 58 and the low pressure chamber 57. This bypass comprises a passage 80 communicating with the high pressure chamber 58 and leading through a hole 81 in the diaphragm 55 to a passage 82 communicating with the low pressure chamber 57. In passage 82 is mounted a tapered valve plug 83 which cooperates with a sharp valve seat formed by the square corners of the end of passage 80. A sealing ring 85 seals the valve plug 83. Interengaging screw threads 86 on the valve plug or stem 83 and in the top plate 52 of the meter body provide means whereby the valve plug 82 may be moved toward or away from the valve seat by rotating the hexagonal head 87 on the outer or free end of the valve stem. Plate 88, held in position by screw 89, prevents the bypass valve from being completely withdrawn and thus permitting the fluid being metered, which fluid may be dangerous, from escaping from the meter body.

While, in accordance with the provisions of the statutes, we have illustrated and described the best form of the invention now known to us, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described our invention what we claim as new and desire to secure by Letters Patent is as follows:

1. A differential-pressure-operated measuring instrument, including, a meter body, a diaphragm separating a high pressure chamber and a low pressure chamber in said meter body, a primary beam pivotally mounted on said meter body and projecting from one of said chambers, a spring comprising a flat resilient strip of substantially triangular shape mounted on said meter body at one end of said spring with its flat face substantially parallel the axis of said primary beam, and a ring adjustably mounted on said primary beam and bearing at its rim on the flat face of said spring so that said spring biases said primary beam.

2. In a measuring instrument, a spring comprising a flat strip of resilient material of uniformly varying cross section mounted at one end and providing a bias to the movable element of said measuring instrument and adapted to transfer movement from said movable element by means of movement of the free end of the spring.

3. A measuring instrument having a sensitive element movable in response to changes in a condition to be measured, a spring yieldingly resisting movement of said element in one direction, said spring being formed of a resilient flat strip mounted as a cantilever and having a uniformly varying transverse dimension, and means for transferring the movement of said spring by engagement with the free end of said spring.

4. A measuring instrument, including, a meter body having a high pressure chamber and a low pressure chamber therein, a diaphragm mounted in said body between said chambers and movable in response to the difference in the pressures therein, a beam pivotally mounted on said meter body and projecting through a wall thereof so that one end of said beam is located inside one of said chambers and the other end of said beam is located outside said one chamber, a connecting rod connecting said diaphragm to the end of said beam in said chamber, a cantilever spring of substantially flat triangular shape mounted at one end on said meter body and having its flat surface substantially parallel to the axis of said beam, and a ring mounted for movement axially of said beam and having engagement with said spring so that said spring applies a bias to said beam and thereby to said diaphragm.

5. A measuring instrument having a sensitive element movable to and fro along one path in response to changes in a condition to be measured, a spring comprising a flat resilient strip of substantially triangular shape mounted at one end of said spring with its flat face substantially perpendicular to said path, and a ring interposed between said sensitive element and said spring and bearing at its rim on the flat face of said spring so that said spring biases said sensitive element, said ring being adjustable toward and away from the stationary end of said spring.

6. A measuring instrument including, a meter body, a movable element mounted in said meter body and movable in response to changes in a condition to be measured, a beam pivotally mounted on said meter body and projecting into the interior thereof and engaging with said movable element, and a spring comprising a flat resilient strip of substantially triangular shape mounted on said meter body at one end of said spring with its flat face substantially parallel to the axis of said primary beam and having bearing engagement with said primary beam.

7. A measuring instrument, including, a meter body, a movable element mounted in said body and movable in response to changes in a condition to be measured, a beam pivotally mounted on said meter body and projecting through a wall thereof so that one end of said beam is located inside said meter body and the other end of said beam is located outside said meter body, a connecting rod connecting said sensitive element to the end of said beam in said meter body, and a cantilever spring of substantially flat triangular shape mounted at one end on said meter body and having its flat surface substantially parallel to the axis of said beam and yieldingly engaging said beam.

8. A measuring instrument according to claim 1 in which the spring is mounted on the meter body at the end of the spring having the largest transverse dimension.

9. A measuring instrument according to claim 7 in which the cantilever spring is mounted on the meter body at the end of the spring having the largest transverse dimension.

References Cited in the file of this patent

UNITED STATES PATENTS

| | | |
|---|---|---|
| 2,084,623 | Pigott | June 22, 1937 |
| 2,090,160 | Spitzglass et al. | Aug. 17, 1937 |
| 2,124,072 | Luckey et al. | July 19, 1938 |
| 2,376,156 | Kuehni | May 15, 1945 |
| 2,487,083 | Warshaw | Nov. 8, 1949 |
| 2,509,644 | Kinderman | May 20, 1950 |
| 2,539,892 | Cook | June 30, 1951 |

FOREIGN PATENTS

| | | |
|---|---|---|
| 161,945 | Great Britain | 1922 |